United States Patent
Jian

(10) Patent No.: US 12,479,625 B2
(45) Date of Patent: Nov. 25, 2025

(54) CONTAINER

(71) Applicant: HOREN CORTP CO., LTD., Shanghai (CN)

(72) Inventor: YuanLi Jian, Shanghai (CN)

(73) Assignee: HOREN CORTP CO., LTD., Shanghai (CN)

(\*) Notice: Subject to any disclaimer, the term of this patent is extended or adjusted under 35 U.S.C. 154(b) by 21 days.

(21) Appl. No.: 18/249,203

(22) PCT Filed: Oct. 14, 2021

(86) PCT No.: PCT/CN2021/123835
§ 371 (c)(1),
(2) Date: Apr. 14, 2023

(87) PCT Pub. No.: WO2022/078453
PCT Pub. Date: Apr. 21, 2022

(65) Prior Publication Data
US 2023/0391497 A1 Dec. 7, 2023

(30) Foreign Application Priority Data
Oct. 15, 2020 (CN) .......................... 202011104576.4

(51) Int. Cl.
*B65D 6/18* (2006.01)
*B65D 19/06* (2006.01)

(52) U.S. Cl.
CPC .......... *B65D 11/1833* (2013.01); *B65D 19/06* (2013.01); *B65D 2519/00502* (2013.01);
(Continued)

(58) Field of Classification Search
CPC ........... B65D 2019/00646; B65D 2019/00611; B65D 2019/00606; B65D 2019/00651; B65D 11/1833
See application file for complete search history.

(56) References Cited

U.S. PATENT DOCUMENTS 3,889,837 A \* 6/1975 Wilson ............... B65D 11/1833
D32/55
4,673,087 A 6/1987 Webb
(Continued)

FOREIGN PATENT DOCUMENTS

| CN | 102133954 A | 7/2011 |
|---|---|---|
| CN | 102133954 B \* | 3/2013 |

(Continued)

OTHER PUBLICATIONS

Translation of Gao 2013 (Year: 2013).\*
(Continued)

*Primary Examiner* — Mollie Impink
(74) *Attorney, Agent, or Firm* — HSML P.C.

(57) ABSTRACT

A container. The container is provided with a base and two pairs of opposing side panels, each side panel being foldably connected to the base. The container further includes connecting members provided on both side edges of each side panel. The two adjacent side panels are operatively connected to each other by means of cooperation between the corresponding connecting members, and the sum of the width of each side panel and the width of the connecting members provided on this side panel is less than the distance between the inner wall surfaces of a pair of adjacent side panels.

11 Claims, 12 Drawing Sheets

(52) U.S. Cl.
CPC .............. *B65D 2519/00582* (2013.01); *B65D 2519/00606* (2013.01); *B65D 2519/00646* (2013.01); *B65D 2519/00711* (2013.01); *B65D 2519/009* (2013.01); *B65D 2588/165* (2013.01)

(56) References Cited

U.S. PATENT DOCUMENTS

| | | | |
|---|---|---|---|
| 9,296,514 B2 * | 3/2016 | Ficker | B65D 11/1833 |
| 2020/0190837 A1 * | 6/2020 | Xia | E04H 1/1205 |

FOREIGN PATENT DOCUMENTS

| | | | | |
|---|---|---|---|---|
| CN | 105819064 A | * | 8/2016 | ............ B65D 19/06 |
| CN | 105947362 A | | 9/2016 | |
| CN | 106184966 A | | 12/2016 | |
| CN | 109976460 A | | 7/2019 | |
| CN | 209112614 U | | 7/2019 | |
| CN | 112193570 A | | 1/2021 | |
| CN | 112278506 A | | 1/2021 | |
| CN | 213677657 U | | 7/2021 | |
| FR | 2609306 A1 | | 7/1988 | |
| FR | 2624831 A1 | | 6/1989 | |
| JP | 2002193252 A | | 7/2002 | |
| KR | 20190037994 A | | 4/2019 | |
| WO | 1999001352 A1 | | 1/1999 | |

OTHER PUBLICATIONS

Translation of CN 105819064 A 2016 (Inventor U) (Year: 2016).*
International Search Report and Written Opinion; International Patent Application No. PCT/CN2021/123835; Dec. 17, 2021; with English translation of Search Report (12 pages).
Office Action issued in corresponding Chinese Application No. 2020111045764, mailed Apr. 17, 2024, with English translation.
Office Action issued in corresponding Chinese Application No. 2020111045764, mailed Dec. 4, 2024, with English translation.
The extended Search Report issued in European Application No. 20210879495, mailed Oct. 25, 2024.

* cited by examiner

CONTAINER

RELATED APPLICATIONS CROSS-REFERENCED

This patent application claims priority to a Chinese patent application 2020111045764 entitled "Container", filed on Oct. 15, 2020, the full text of which is incorporated herein by reference.

TECHNICAL FIELD

The present invention relates to logistics apparatuses, and in particular to a foldable container, especially an intermediate bulk container.

TECHNICAL BACKGROUND

A foldable intermediate bulk container, also known as foldable IBC, mainly consists of a base, two pairs of side panels and a cover. Due to its foldable characteristic, it has obvious economic advantages over a traditional non-foldable IBC in empty storage and return transportation, and is widely favored by users in the field of liquid packaging. The traditional foldable IBC has the structure substantially shown in FIG. 15, with two pairs of side panels connected to the base, and adjacent side panels connected to each other substantially at the corners of the container through engagement structures. Generally, one pair of side panels with shorter width is folded firstly, and then the other pair of side panels is folded. The advantage of such a structure is that the short side panels are located between the two long side panels when upright and can help the long side panels to resist external pushing/pressure, but the long side panels have almost the same width as the base, and the long side panels must lie on the short side protruding edge at the base when folded. So, the short side protruding edge and the long side protruding edge of the base are not able to be at the same height, making the long side protruding edge less rigid against the lateral pressure of liquid when the container is fully loaded, and even requiring additional support members inside the base to compensate for its lack of strength.

It is a common use scenario for IBC that containers are stacked outdoors. When the side panels are folded, due to the inconsistent height of the base protruding edges, the traditional IBC still has a part area of the short side protruding edges that can not be covered by the cover panel after the cover panel is put on. After a long period of storage, it is inevitable that rain, dust and the like will accumulating the container, resulting in mould or insect ants, which brings great hygiene problems and increases the difficulty of cleaning.

Therefore, there is a need in this field for a container that remains hygienic after prolonged outdoor storage.

SUMMARY OF THE INVENTION

An object of the present invention is to provide a container to solve the problem of contamination within the container caused by long-term outdoor storage in the prior art.

To achieve the object, the present invention provides a container, which has a base and two pairs of opposing side panels, each of the side panels is foldably attached to the base, wherein the container further comprises connecting members provided on two side edges of each side panel, two adjacent side panels are operatively connected to each other by means of cooperating between the corresponding connecting members, and the sum of the width of each side panel and the width of the connecting member provided on this side panel projected in a normal direction of this side panel is less than the distance between the inner wall surfaces of the adjacent pair of side panels.

In an embodiment, a distance between a side edge [1] of the connecting member provided on each of the side panels and an inner wall surface of the adjacent side panel is greater than zero, the side edge is connected to the connecting member of the adjacent side panel.

In an embodiment, the connecting member of each of the side panels is inclined towards the interior of the container with respect to this side panel.

In an embodiment, the connecting member is integrally formed with or fixedly connected to two side edges of the side panel.

In an embodiment, the connecting member of the side panel and the corresponding connecting member of an adjacent side panel together form a set of corner assemblies, the container comprising a plurality sets of corner assemblies, adjacent side panels are interconnected by the corresponding corner assemblies, wherein the sum of the width of the side panels and the width of the connecting members connected to the side panels when unfolded is less than the distance between the inner wall surfaces of the adjacent pair of side panels.

In an embodiment, the connecting member is hinged to the side panel.

In an embodiment, each of the side panels is provided with a reinforcement assembly, wherein a first side edge of the connecting member of each of the side panels is connected to the reinforcement assembly of this side panel.

In an embodiment, the reinforcement assembly of each side panel has a plurality of reinforcement members interconnected into a frame.

In an embodiment, the connection body is provided with a hinge hole, and one of the reinforcement members of the reinforcement assembly is rotatably inserted into the hinge hole of the corresponding connection body.

In an embodiment, the side panel has an inner panel, an outer panel and the reinforcement assembly disposed between the inner panel and the outer panel, wherein the inner panel and the outer panel are connected to each other.

In an embodiment, a second side edge of the connecting member provided by the side panel is provided with a first engagement structure, and a second side edge of the connecting member provided by the side panel adjacent to this side panel is provided with a second engagement structure, the second side edge is opposite to the first side edge, wherein the first engagement structure and the second engagement structure are operatively engaged with each other, and the second side edge of the connecting member provided by one side panel and the second side edge of the connecting member provided by the other side panel adjacent to the one side panel are provided with locking structures.

In an embodiment, the second side edge of the connecting member provided by the side panel and the second side edge of the connecting member provided by another side panel adjacent to this side panel are provided with locking structures that cooperate with each other.

In an embodiment, the base has a base panel and two pairs of opposite protruding panels extending from the outer periphery of the base panel, wherein the two pairs of opposite protruding panels have the same height.

In an embodiment, the distance between the inner sides of any pair of opposite protruding panels of the base is greater than or equal to the total width of the corresponding side panels.

In an embodiment, the height of the protruding panel of the base is greater than the sum of the thicknesses of the two pairs of opposing side panels.

In an embodiment, a lower surface of each of the side panels extends with side panel hinging portions spaced apart from each other, the side panel hinging portions are provided with hinge pins; the protruding panel of the base is provided with open pockets, the open pockets are provided with hinge slots, wherein the hinge pins are rotatably mounted in the hinge slots.

In an embodiment, the height of the open pockets provided in one pair of the opposite protruding panels is greater than the height of the open pockets provided in the other pair of the opposite protruding panels.

In an embodiment, the container further comprises a cover panel, which has a cover panel body and an outer peripheral protruding edge extending downward from the cover panel body, the inner peripheral surface profile of the outer peripheral protruding edge matching the outer peripheral surface profile of two pairs of the opposite protruding panels of the base.

In an embodiment, the base is further provided with a discharging port and forklift grooves, the discharging port is located between the base panel and one of the protruding panels and communicates the inner and outer sides of the base, the forklift groove is located on the lower surface of the base panel.

The present invention provides a new structure of foldable IBC, and by providing chamfers of significant size at the locations where the side panels are interconnected and then placing the connecting structure of the side panel at the chamfer area, so that the width of each side panel is smaller than the inner dimension of the base of the container, thereby enabling the side panels to be completely located inside the base when folded, the present invention achieves a structure with a consistent height of the protruding edge of the base. The present invention significantly differs from the architecture of the traditional folding container and improves its sanitary keeping condition.

EMBODIMENTS

The preferred embodiment of the present invention will be described in detail with reference to the accompanying drawings, so that the purposes, the characteristics and the advantages of the invention can be more clearly understood. It should be understood that the embodiments shown in the figures are not intended to limit the scope of the present invention, but illustrate the essential spirit of the technical solution of the present invention.

In the following description, certain specific details are set forth for purposes of illustrating the various disclosed embodiments to provide a thorough understanding of the various disclosed embodiments. However, those skilled in this art will recognize that embodiments may be practiced without one or more of these specific details. In other instances, well-known devices, structures, and techniques associated with the present application may not be shown or described in detail to avoid unnecessarily obscuring the description of the embodiments.

Unless the context is otherwise required, throughout the specification and claims, the words "comprise" and its variations, such as "include" and "has" shall be understood as an open, including meaning, that is, it shall be construed as "include, but not limited to."

Throughout the specification "one embodiment" or "an embodiment" means that a particular feature, structure, or characteristic described in connection with the embodiment is included in at least one embodiment. Therefore, the presence of "in one embodiment" or "in an embodiment" at various locations throughout the specification need not all refer to the same embodiment. Additionally, particular features, structures, or features may be combined in any manner in one or more embodiments.

As used in the specification and appended claims, the singular forms "a" and "the" include plural referents, unless clearly stated in the context. It should be noted that the term "or" is generally used in a sense that includes "and/or", unless clearly stated in the context otherwise.

In the following description, for clarity of illustration of the structure and mode of operation of the present invention, various directional words will be used to describe the present invention, but words such as "front", "rear", "left", "right", "outer", "inner", "outward", "inward", "upper", "lower", and the like, should be understood as convenient words and should not be construed as limiting words.

A foldable composite IBC (intermediate bulk container) are widely used in the logistics field, usually with a dimensions of about 1.2 meters long and 1 meter wide, and generally have a base, two pairs of side panels, and a cover panel, where the side panels and the base can be removably connected together.

Figure 1:
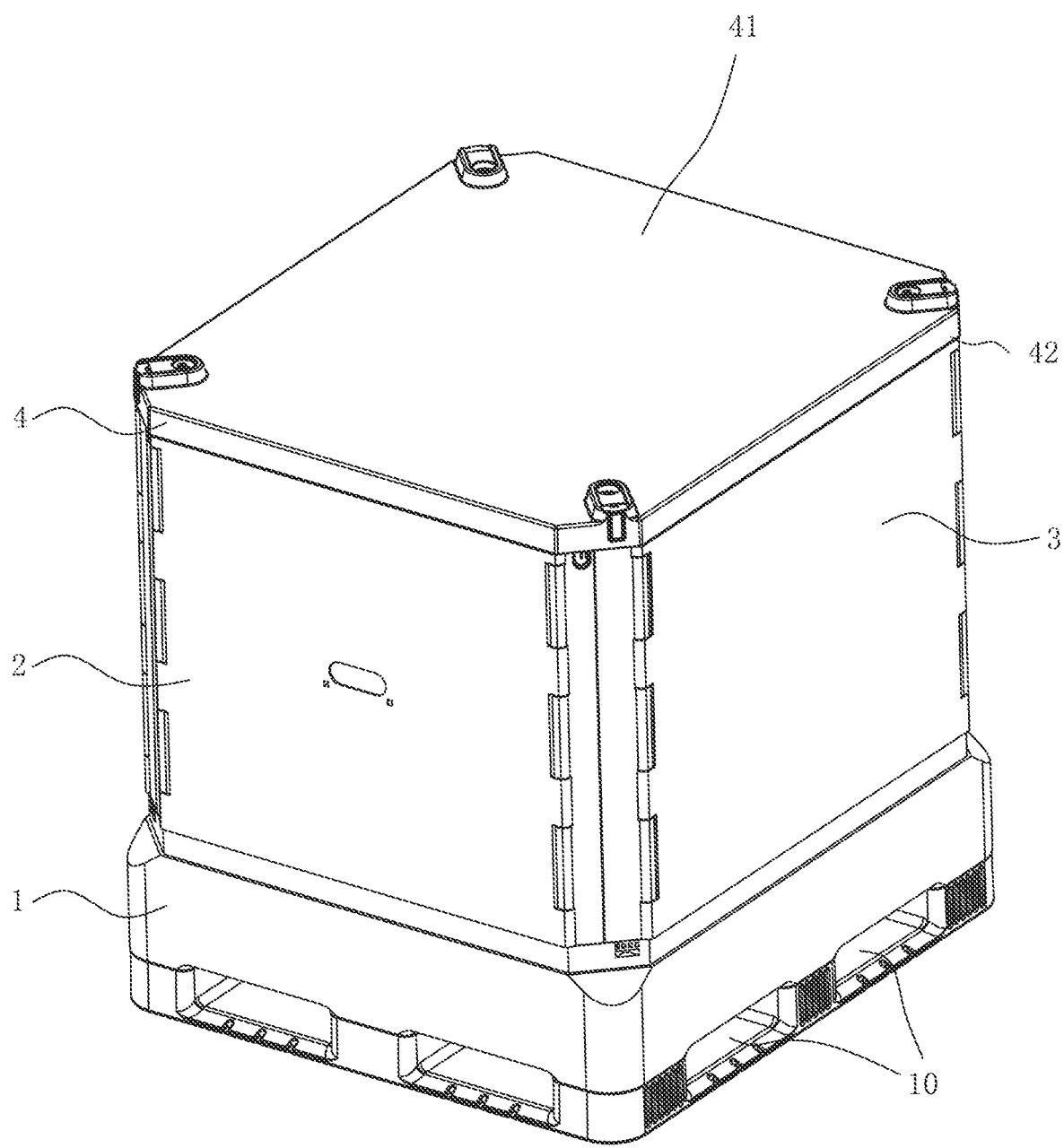
FIG. 1 is a perspective view of a container according to an embodiment of the present invention.

Referring to FIG. 1, a container 100 according to the present invention comprises: a base 1, two pairs of opposing side panels 2 and 3 extending vertically from the base 1 and connected with each other, and a cover panel 4 provided opposite the base 1. Wherein the two pairs of opposing side panels 2 and 3 are removably connected to the base 1 at the bottom edge thereof, and the two pairs of opposing side panels 2 and 3 are provided with connecting members at both side edges thereof, and the two adjacent side panels 2 and 3 are operatively connected to each other by means of cooperation between the corresponding connecting members. Wherein the two pair of cooperating connecting members form corner assemblies 5 and 6. Each of the side panels 2 and 3 is hingedly connected to the base 1, so that when not in use, each of the side panels 2 and 3 is foldable relative to the base 1 for easy storage and retrieval.

Figure 2:
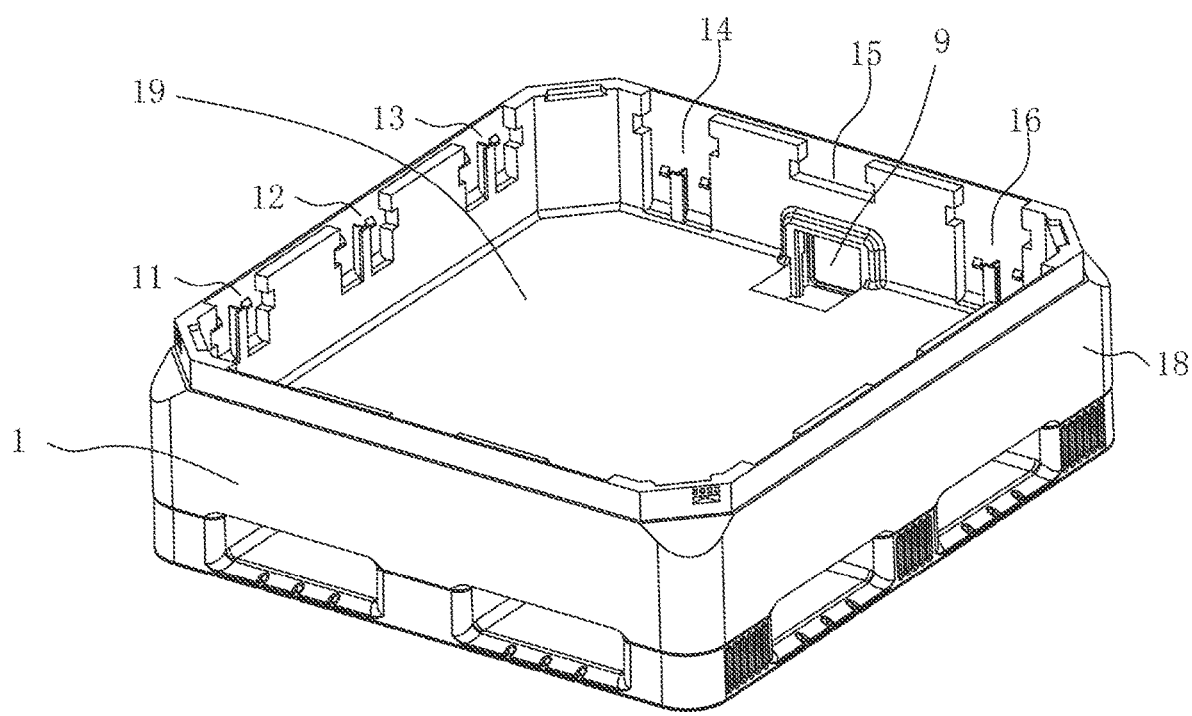
FIG. 2 is a perspective view of the base of a container according to an embodiment of the present invention.

FIG. 2 shows a perspective view of the base 1. The base 1 includes a substantially rectangular base panel 19 and two pairs of opposite protruding panels 18 extending perpendicularly from the periphery of the base panel 19, wherein the two pairs of opposite protruding panels are of the same height. Each protruding panel is provided with a plurality of open pockets on the inner side, three open pockets 11, 12, and 13 in one protruding panel 18 and three open pockets 14, 15 and 16 in the other protruding panel are shown in the figure. Each open pocket is open upward and inward to receive each protruding portion provided on the bottom edges of side panels 2 and 3, respectively. Each open pocket is optionally provided with hanging slots 131, 141 or hinge slots 132, 142 to cooperate with hanging shoulders 241, 331 or hinge pins 242, 332 optionally provided on each protruding portion on the bottom edge of side panels 2 and 3 to form an articulated structure of the side panels relative to the protruding panels 18, thereby allowing the side panels to be folded inside the container. To facilitate stacking of the side panels, in the illustrated embodiment, the height of the open pockets 14, 15 and 16 in one pair of protruding panels is greater than the height of the open pockets 11, 12, 13 in the other pair of protruding panels 18. In this way, one pair of side panels can be folded at different heights relative to the other pair of side panels, thereby facilitating stacking between the side panels.

A discharging port 9 is provided between the base panel 19 and the protruding panel 18 of the base 1, the discharging port 9 communicate the inside and outside of the base 1, thereby facilitating the discharge of the contents in the container 100 to the outside when needed. Also as shown in FIGS. 1 and 2, forklift grooves 10 are provided in the base 1 on the lower side of the base panel 19 to facilitate insertion of forklift forks therein to carry the container 100.

Figure 3:
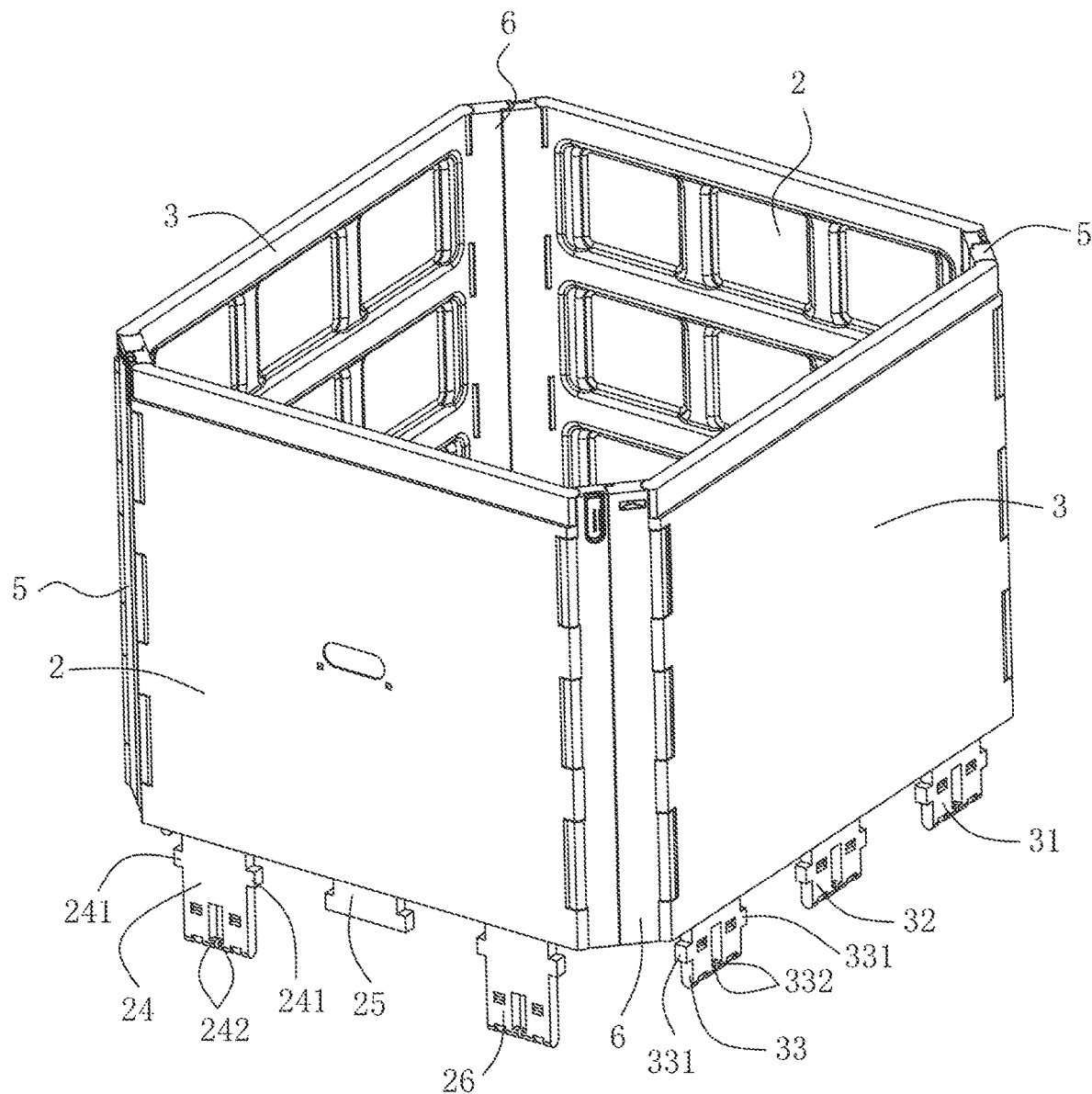
FIG. 3 is a perspective view of side panels of a container according to an embodiment of the present invention.

FIG. 3 shows a perspective view of the side panels 2 and 3 connected to each other. The side panels 2 and 3 are provided with protruding portions at the bottom edge thereof which extend downward from the bottom edge, and there are shown protruding portions 24, 25 and 26 extending downward from the bottom edge of one side panel 2 and protruding portions 31, 32 and 33 extending downward from the bottom edge of one side panel 3. The respective protruding portions may be correspondingly received within the respective open pockets to connect the respective side panels 2 and 3 to the base 1. Optionally, the corresponding protruding portions are also provided with hanging shoulders 241, 331 or hinge pins 242, 332 to cooperate with the hanging slots 131, 141 or hinge slots 132, 142 optionally provided in the respective open pockets to form a hinged connection structure, so that each of the side panels can be folded inside the container. Although the drawings show that each side panel is connected to the base 1 by three sets of open pockets and protruding portions, it should be understood that the number of open pockets and protruding portions may also be set as desired without departing from the scope of the present invention.

Figure 4:
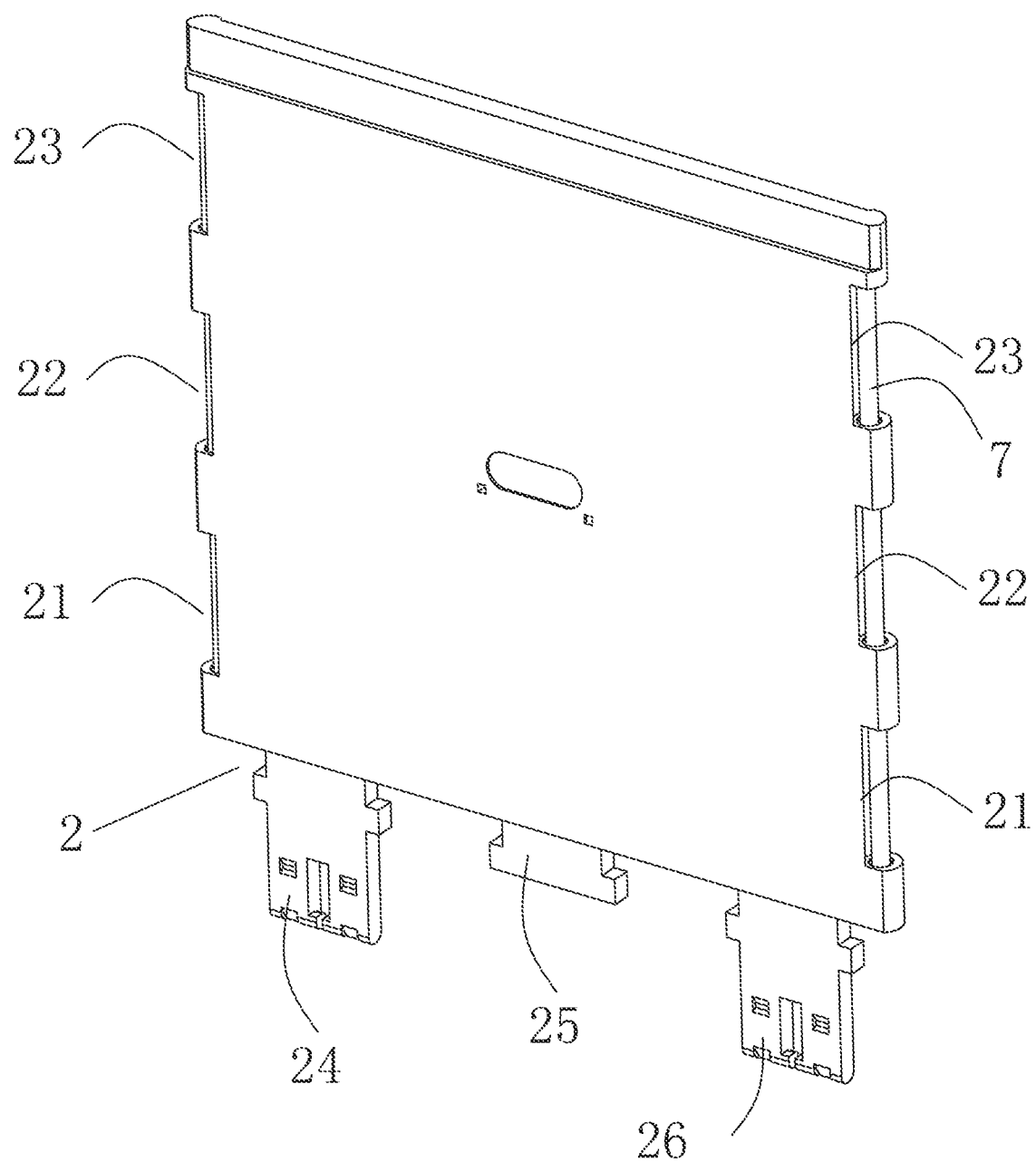
FIG. 4 is a perspective view of a side panel of a container according to an embodiment of the present invention.

FIG. 4 shows a perspective view of one side of the side panel 2. cutouts 21, 22 and 23 are provided bottom-up on each side edge of the side panel 2. The cutouts 21, 22 and 23 run through the thickness of the side panel 2 and are spaced apart from each other along two side edges. The same cutouts are also provided on two side edges of the side panel 3 and are not described here again.

The side panels 2 and 3 consist of two layers of panels spaced apart from each other and interconnected. The side panels 2 are provided with a reinforcement assembly between the two layers of panels, i.e., an inner panel and an outer panel. Two sides of the reinforcement assembly respectively includes two vertical pivot tubes 7 running vertically through side panel 2. The pivot tubes 7 are exposed from side panel 2 at respective cutouts 21, 22 and 23. The other side panels 2 and 3 are similarly provided with cutouts and reinforcement assemblies. The reinforcement assembly may be made of a material that is stronger than the two layers of panels of side panel 2. For example, the reinforcement assembly may consist of a plurality of horizontal stiffen members and a plurality of vertical stiffen members connected to each other to form a frame structure. However, it should be understood that the reinforcement assembly may be provided in other ways as desired.

Figure 5:
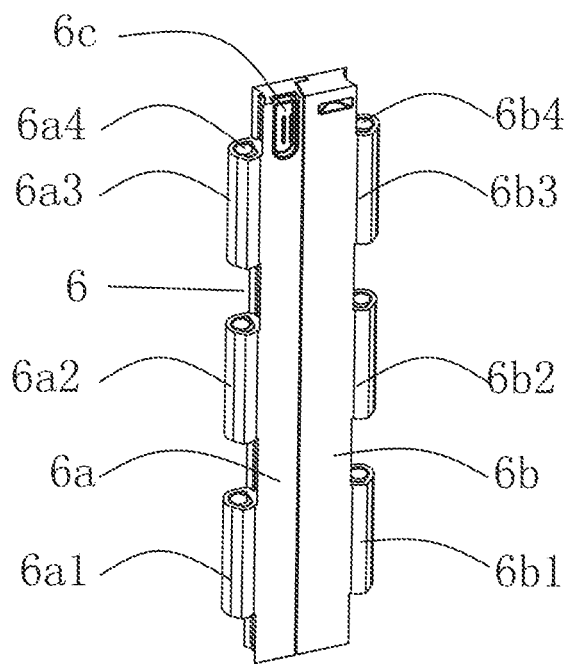
FIG. 5 is a perspective view of a corner assembly of a container according to an embodiment of the present invention, in which a pair of connecting members is in an engaged state.
Figure 6:
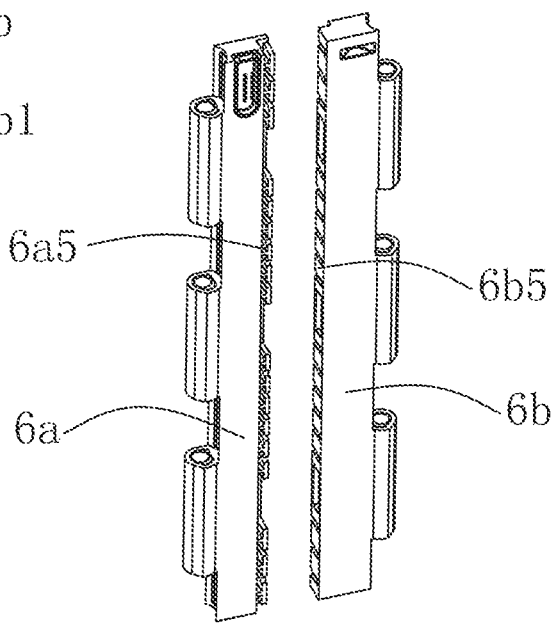
FIG. 6 is a perspective view of a corner assembly of a container according to an embodiment of the present invention, wherein the pair of connecting members is in a disengaged state.

FIGS. 5 and 6 show perspective views of the corner assembly 6. The height of the corner assembly 6 is the same as the height of the side panels 2 and 3. The corner assembly 6 comprises a connecting member 6a and a connecting member 6b. The outer side edge of connecting member 6a and 6b is defined as a first side edge, the first side edge of the connecting member 6a and 6b is provided with protruding portions 6a1, 6a2, 6a3 and 6b1, 6b2, 6b3 respectively. Each of the protruding portions is provided with vertically extending through holes 6a4 and 6b4 for interconnection with the pivot tube 72. Each of the protruding portions 6b1, 6b2, and 6b3 corresponds to each of the cutouts 21, 22, and 23 in the side panel respectively and can be snapped into the cutouts 21, 22, and 23. And, the pivot tube 72 can be sequentially passed through each of the protruding portions 6b1, 6b2, 6b3, thereby forming hinged connection with the side panel 2. Wherein, the vertically extending through hole 64b functions as a hinge hole, and the pivot tube 72 is rotatably inserted into the vertically extending through hole 6b4. Thus, one side edge of the corner assembly 6 forms an hinged connection with the side panel 2. The other side of the corner assembly 6 also forms an hinged connection with the adjacent side panel 3. Thus, the two adjacent side panels 2 and 3 are connected to each other by the corner assemblies 6. However, it should be understood that the side panels and the connecting member may form an hinged connection with each other by other means known in the art without departing from the scope of the present invention.

In the present invention, both side panels 2 and side panels 3 are provided with reinforcement assemblies, and the respective side panels 2 and 3 are connected to each other through corner assemblies 5 and 6 connected with pivot tubes 7 of the reinforcement assemblies, thus replacing direct engagement between side panels in the prior art to achieve a higher strength connection. Since the prior engagement structure is eliminated, the side panels 2 and 3 are no longer limited to be made by welding processes such as hot panel welding or vibratory friction welding, and also can be made by twin sheet forming or blow molding processes, etc.

Figure 9:
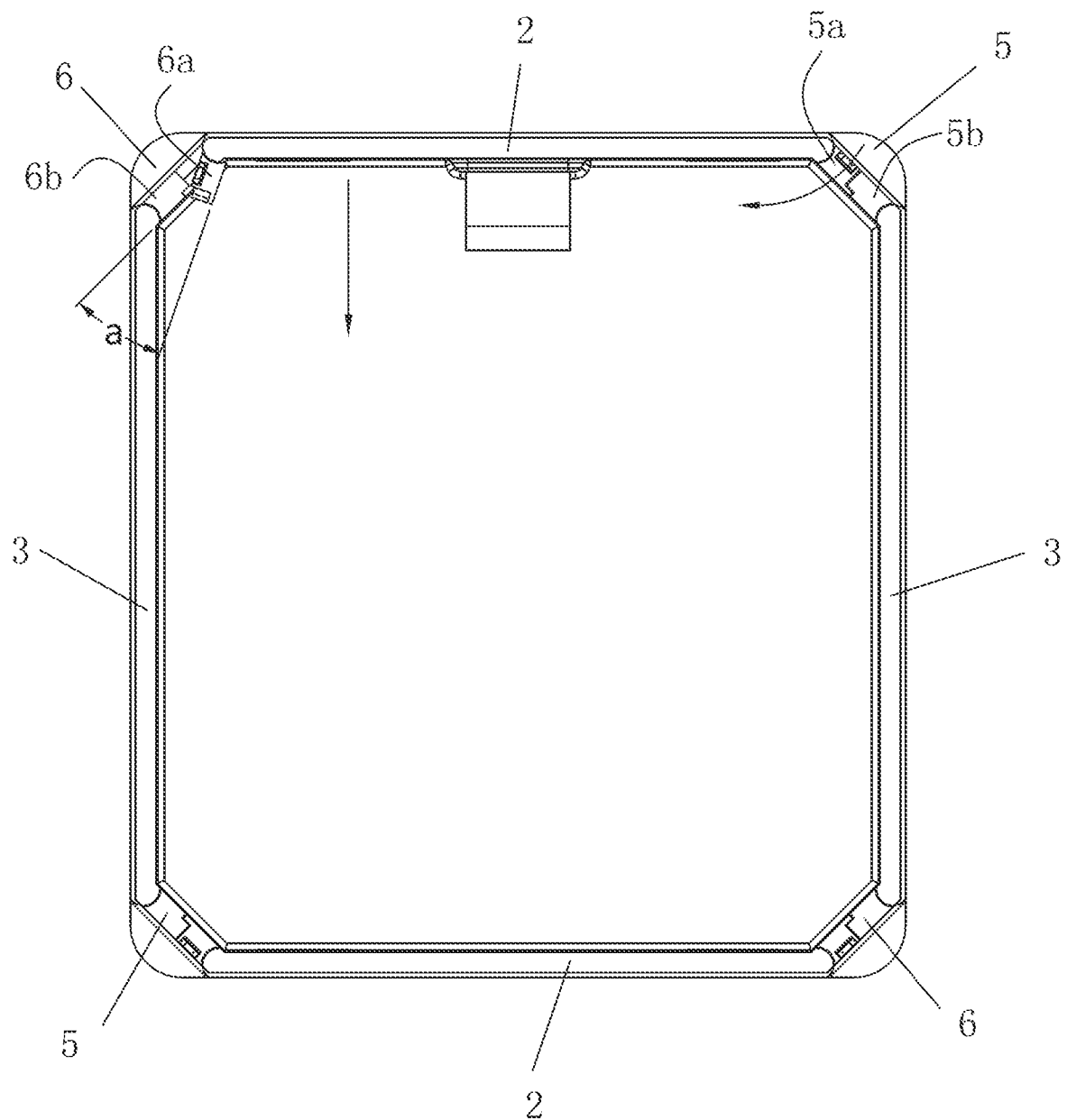
FIG. 9 is a top view of a container according to an embodiment of the present invention in a ready-to-fold state.

As shown in FIGS. 5 and 6, the side edge of the connecting members 6a and 6b opposite each other is defined as a second side edge, and the second side edges of the connecting members 6a and 6b are provided with a first engagement structure 6a5 and a second engagement structure 6b5, respectively. The first engagement structure 6a5 and the second engagement structure 6b5 are operatively engaged with each other. The connection bodies 6a and 6b are interconnected by the first engagement structure 6a5 and the second engagement structure 6b5. The engagement structures are engagement teeth, engagement grooves, or engagement hooks extending from opposite edges of the connecting members 6a and 6b along an extension plane in which the connecting members are located, which may be dovetailed, T-shaped, or otherwise shaped, with an extension direction of the engagement structures set such that the connecting members can be disengaged from the adjacent engagement bodies after rotating about the axial hole (FIG. 9). This structure allows the connecting members 6a and 6b to be rotated about the pivot tube 7 of the side panel by a certain angle, so that the two connecting members can be disconnected from the connected state, thus allowing a folding operation. In the embodiment shown, the connecting members 6a and 6b in an engaged state are located in a plane.

Figure 7:
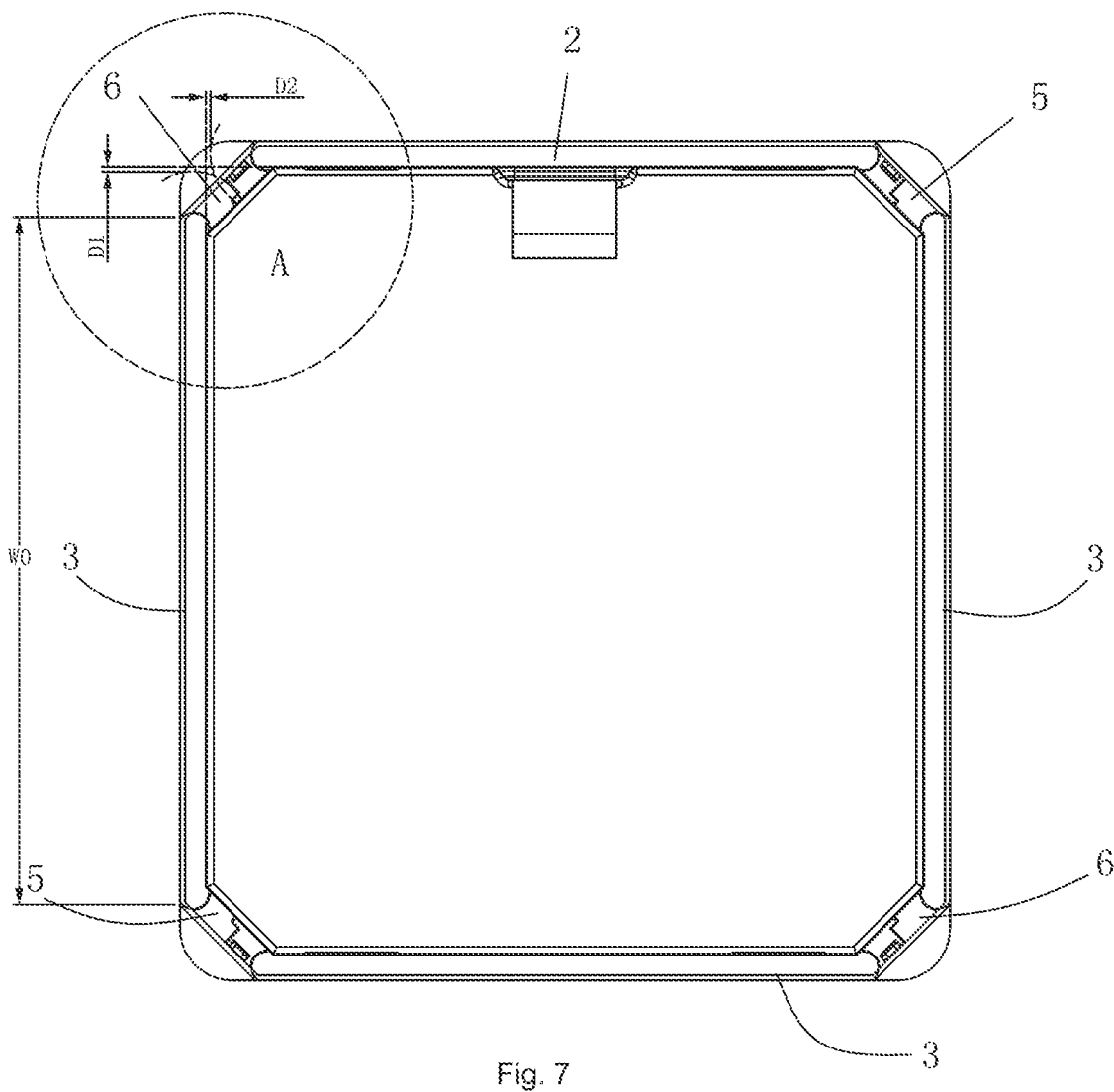
FIG. 7 is a top view of a container according to an embodiment of the present invention in a use state.
Figure 8:
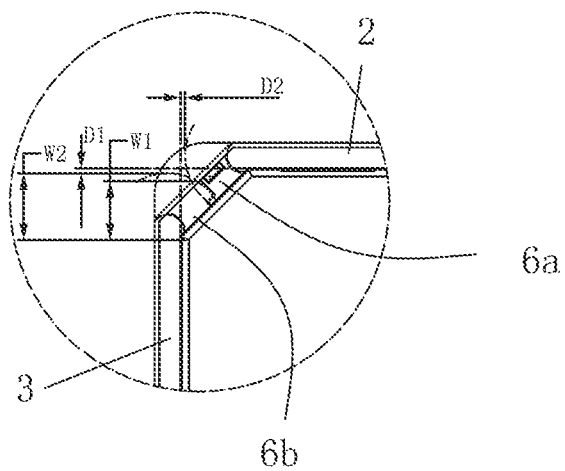
FIG. 8 is an enlarged view of the circled portion A in FIG. 7.

FIG. 7 shows a top view of the container 100 of the present invention in use. FIG. 8 shows an enlarged view of the circled portion of FIG. 7. As shown in FIG. 7, adjacent side panels 2 and 3 are connected to each other by corner assemblies 5, 6. Wherein, the corner assembly 5 and the corner assembly 6 are each formed by a pair of connecting members and are set at an angle to the adjacent side panels. Thus, in the top view, the connecting members of each side panel are inclined towards the interior of the container with respect to this side panel, and a pair of connecting members of the corner assemblies are located in the same plane, so that the two pairs of side panels 2 and 3 and the two pairs of corner assemblies 5 and 6 form an octagonal shape. In the preferred embodiment shown, the corner assemblies 5 and 6 are at an angle of 45° to the plane in which the side panels are located, but it should be understood that the corner assemblies 5 and 6 may also be at other angles to the plane in which the side panels are located. The sum of the width W0 of each side panel and the width W1 of the connecting member connected to this side panel projected in a normal direction of this side panel is less than the distance between the inner wall surfaces of the adjacent pair of side panels. When the connecting member connected to the side panel can be unfolded relative to the side panel, the sum of the width W0 of each side panel and the unfolded width W2 of the connecting member connected to this side panel is also less than the distance between the inner wall surfaces of the adjacent pair of side panels.

As shown in FIG. 8, the distance between the first side edge of the connecting member and the plane of the inner wall surface of the adjacent side panel 3 in the state where the side panel 2 and its connecting member are flattened is D1, and in the state where the side panel 3 and its connecting member are flattened, the distance between the first side edge of the connecting member and the plane of the inner wall surface of the adjacent side panel 2 connecting member is D2. In order to ensure that the side panels do not interfere with the adjacent side panels during folding and can be folded within the adjacent pair of protruding panels 18, D1 and D2 should be greater than zero. Preferably, D1≥3 mm and D2≥3 mm. As a result of this dimensional setting, the total width of each side panel and its connected connecting member when flattened is less than the width between a pair of opposite protruding panels 18 of its adjacent base 1, thus allowing each side panel to be lay completely flat in the container base after folded with respect to base 1 (FIG. 12), so that the four protruding panels of base 1 can be set to the same height.

FIG. 9 shows a schematic diagram of a connecting member of the corner assembly 6 of the container 100 according to the present invention rotated relative to the side panel 2 to disengage from engagement with an adjacent connecting member. In this figure, the connecting member 6a connected to the side panel 2 is rotated inwardly around the hinge hole and at an angle α with respect to the connecting member 6a in use.

Figure 10:
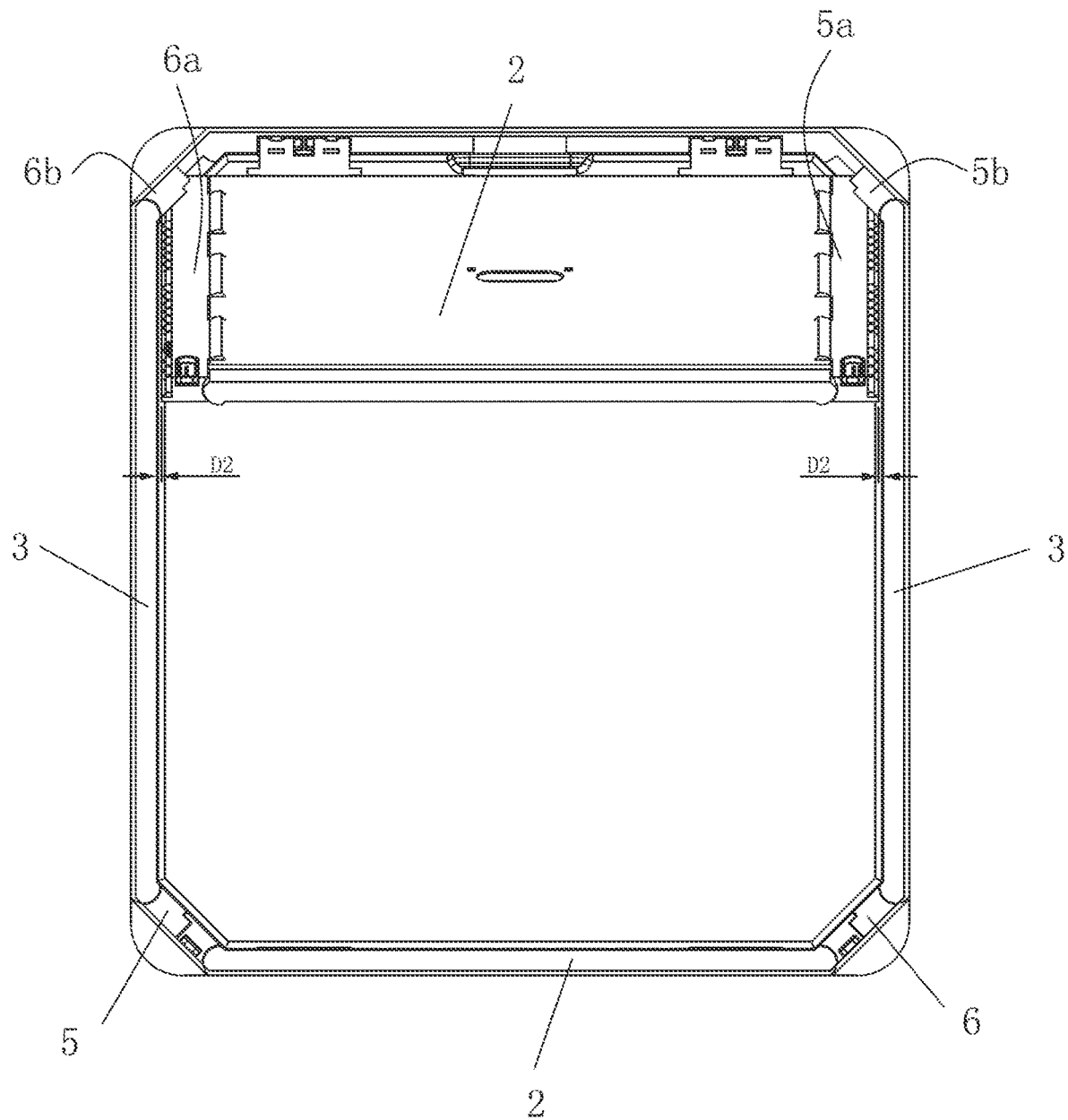
FIG. 10 is a top view of a container according to an embodiment of the present invention when being folded.

FIG. 10 shows a schematic view of the side panels 2 of the container 100 according to the present invention during folding downward with respect to the base 1. As shown in FIG. 10, during the folding process, the side panel 2 and the connecting members 6a and 5a to which it is connected are in a flattened state, and during the folding process, the distance between the side panel 2 and its connecting members 6a and 5a and the inner walls of the two adjacent side panels 3 is D2, thus ensuring that the side panel 2 and its connecting members 6a and 5a are laid completely flat between the corresponding pair of protruding panels 18 of the base 1.

Figure 11:
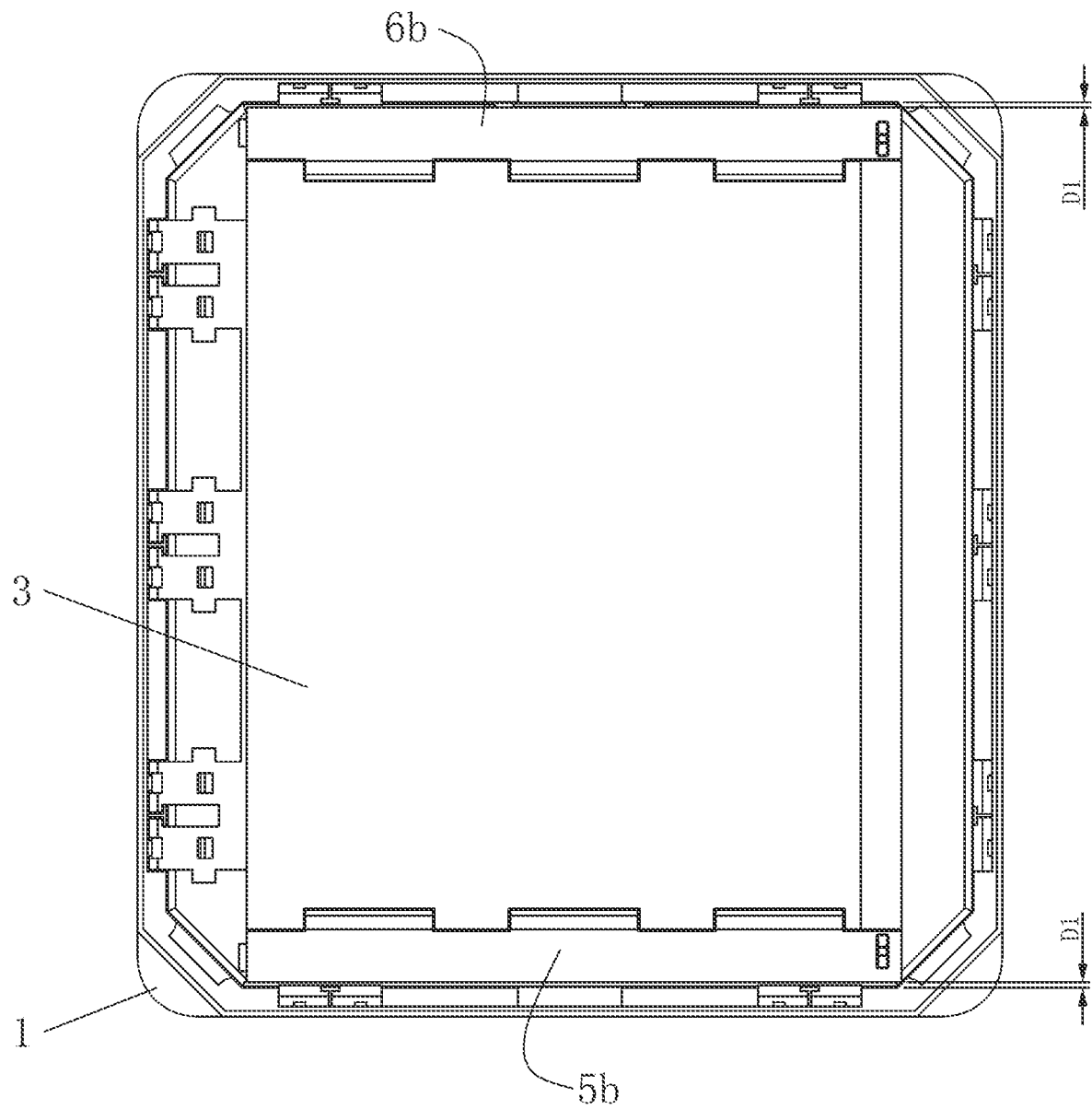
FIG. 11 is a top view of a container according to an embodiment of the present invention in a folded state.

FIG. 11 shows a top view of the container 100 according to the present invention with two pairs of side panels folded on the base 1, wherein the side panel 3 is located above the side panel 2. As shown in FIG. 11, during the folding process, the side panel 3 and the connecting members 6b and 5b to which it is connected are in a flattened state, and during the folding process, the distance between the side panels 3 and its connecting members 6b and 5b and the inner walls of the two adjacent side panels 2 is D1, thus ensuring that the side panel 3 and its connecting members 6b and 5b are laid completely flat between the corresponding other pair of protruding panels 18 of the base 1.

Figure 12:
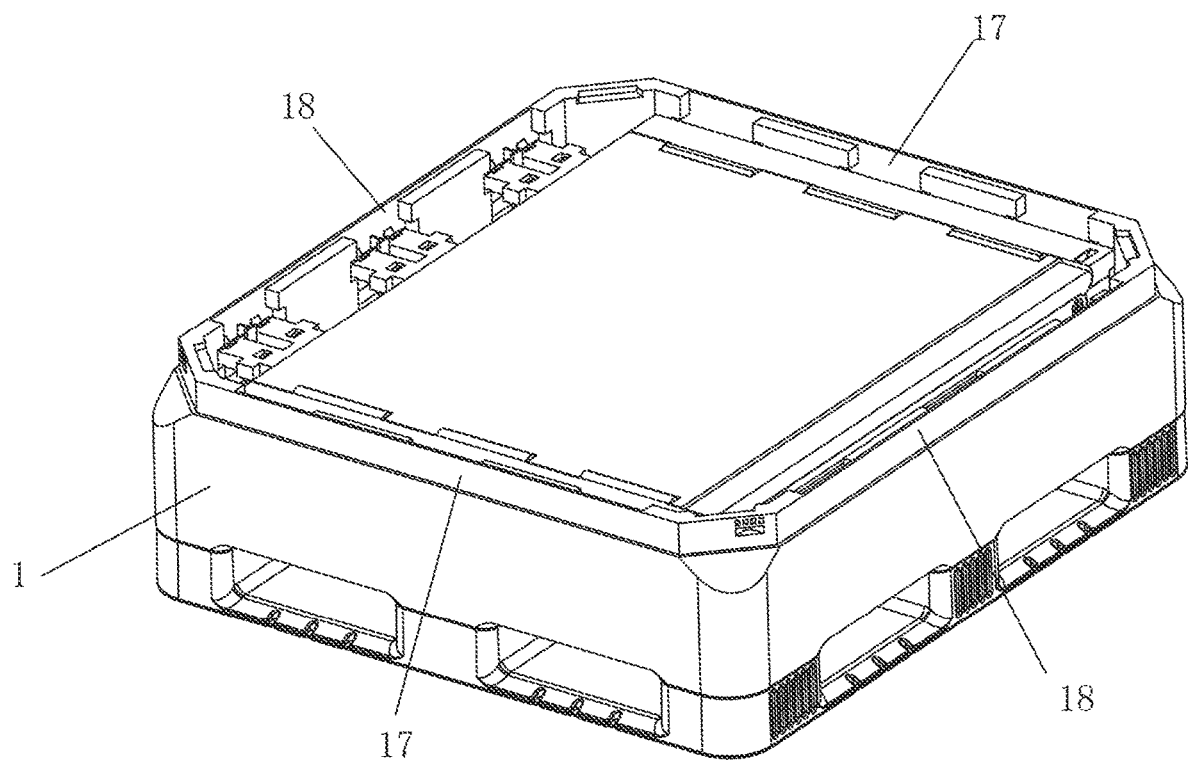
FIG. 12 is a perspective view of a container according to an embodiment of the present invention in a folded state.

FIG. 12 shows a perspective view of the container 100 according to the present invention with two pairs of side panels 2 and 3 folded on the base 1. As shown in FIG. 12, the height of the protruding panel 18 is greater than the sum of the thicknesses of the two pairs of side panels 2 and 3, so that the two pairs of side panels 2 and 3 are laid flat in the space enclosed by the protruding panels 18 and do not exceed above the protruding panel 18. Thus, the cover panel 4 can be placed on the folded container after folding. Returning to FIG. 1, the cover panel 4 has a cover panel body 41 and an outer peripheral protruding edge extending downward from the cover panel body 41, the inner peripheral surface profile of the outer peripheral protruding edge matches the outer peripheral surface profile of the protruding panel 18, thereby enabling the cover panel 4 to closely cover on the folded container. This structure allows the container 100 of the present invention to be protected from contamination by rainwater, etc., even if it is placed outdoors in the folded storage state.

Figure 13:
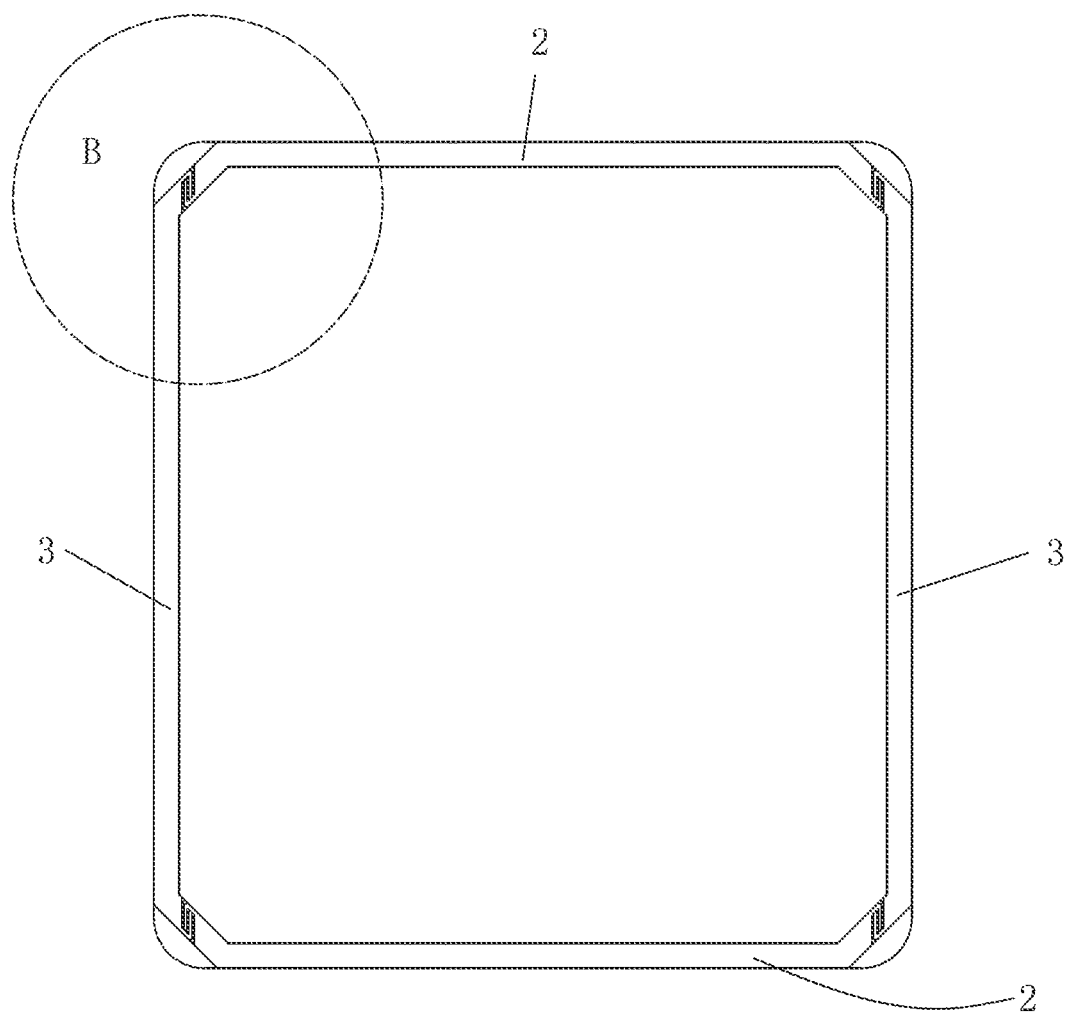
FIG. 13 is a top view of a container according to another embodiment of the present invention in use.
Figure 14:
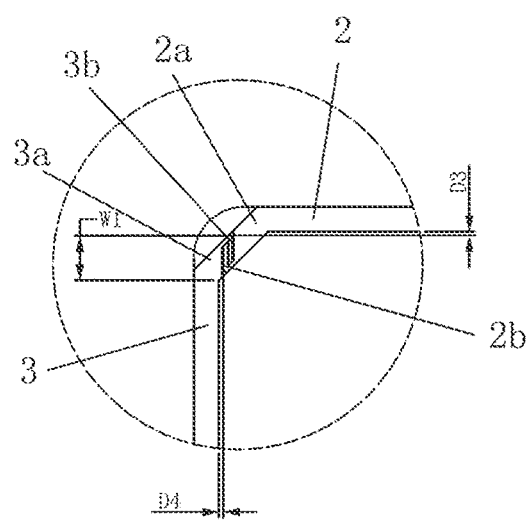
FIG. 14 is an enlarged view of the circled portion B in FIG. 13.
Figure 15:
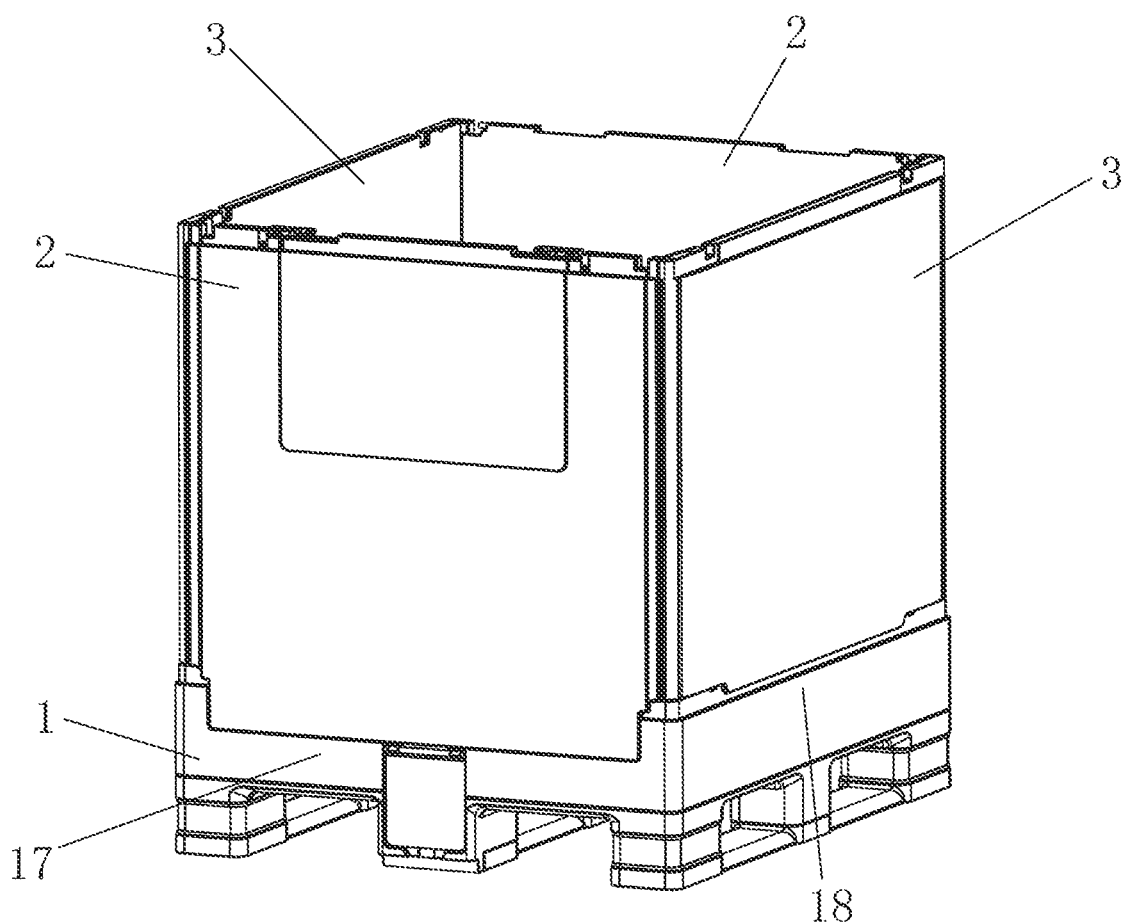
FIG. 15 is a perspective view of a prior art container.

FIGS. 13 and 14 show another embodiment of a container according to the present invention. This embodiment differs from the previous embodiment only in that the two connecting members of the corner assembly are formed integrally with the side panels 2 and 3, respectively, and that the adjacent connecting members are located in the same plane. In the preferred embodiment shown, the corner assemblies 5 and 6 are at a 45° angle to the plane in which the side panels are located, but it should be understood that the corner assemblies 5 and 6 may also be at other angles to the plane in which the side panels are located. Opposite edges of the two connecting members of the corner assembly are provided with engagement structures that cooperate in a extension direction parallel to the side panel 3. FIG. 14 shows an enlarged view of the circled portion of FIG. 13, in which the edge of the side panel 2 is integrally provided with a connecting member 2a, and the edge of the side panel 3 is integrally provided with a connecting member 3a, and the edge of the connecting member 2a is provided with a snap hook 2b, and the outer end 3b of the connecting member 3a is formed with a corresponding snap slot, and the snap hook 2b of the connecting member 2a is snapped into the slot of the connecting member 3a in the direction parallel to the side panel 3, so as to realize the engagement between the connecting members. When the side panels 2 and 3 need to be folded, the side panels 2 are firstly folded, and the engagement between the side panels 2 and the side panels 3, i.e. between the connecting members 2a and 3a, is disengaged while the side panels 2 are folded downward. Then the side panel 3 is folded downward. The distance between the outer edge of the connecting member 2a and the plane where the inner wall surface of the side panel 3 is located is D4, and the distance between the outer edge of the connecting member 3a and the plane where the inner wall surface of the side panel 2 is located is D3. Similarly, D4≥3 cm, D3≥3 cm, thus ensuring that the side panels 2 and 3 maintain a certain gap with the adjacent side panels and the protruding panel 18 during the folding process, and ensuring that the side panels and their connecting members are laid completely flat between the corresponding pair of protruding panels 18 of the base 1. Similarly, the sum of the width W0 of each side panel and the width W1 of the connecting member connected to this side panel projected in a normal direction of the side panel is less than the distance between the inner wall surfaces of the adjacent pair of side panels.

In addition, the engagement between adjacent side panels requires locking, which can be achieved by any locking mechanism known or to be developed in the prior art of the field, which will not be described herein. Preferably, two adjacent side panels are provided with mutually cooperating locking mechanisms 6c on the opposite connecting members provided on the adjacent side edges of the two adjacent side panels.

The inventor found that modifying the traditional side panel by chamfering at the corner of the connection, and then the engagement structure is designed according to certain size specifications, the side panel can be completely folded in the protruding panel of the base, the chamfer may be a certain angle of bevel (30° to) 45°, also may be rounded or nearly rounded. When the side panels are completely folded in the base, the four protruding panels of the base can be designed to a uniform height, and it is easy to keep the box in better sanitary conditions.

The preferred embodiments of the invention have been described in detail above, but it should be understood that aspects of the embodiments can be modified to provide additional embodiments using aspects, features and ideas from various patents, applications and publications, if desired.

Considering the detailed description above, it is possible to make these and other variations to the embodiments. In general, the terms used in the claims should not be considered to be limited to the specific embodiments disclosed in the specification and claims, but should be understood to include all possible embodiments together with the full scope of equivalents enjoyed by those claims.

The invention claimed is:

1. A container comprising:
   a base;
   two pairs of opposing side panels, each of the side panels is foldably connected to the base; and
   connecting members provided on both side edges of each of the side panels,
   wherein two adjacent side panels are operatively connected to each other by means of cooperating between the corresponding connecting members, and a sum of a width of one of the side panels and a width of the two connecting members provided on the one of the side panels projected in a normal direction of the one of the side panels is less than a distance between inner wall surfaces of side panels adjacent to the side panel being measured,
   wherein the base has a base panel and two pairs of opposite protruding panels extending from an outer periphery of the base panel, wherein the two pairs of opposite protruding panels have a same height,
   wherein one of the connecting members on one of the side panels and the corresponding connecting member on the adjacent side panel together form a corner assembly, wherein the sum of the width of the one of the side panels and the width of unfolded connecting members connected to the one of the side panels is less than the distance between the inner wall surfaces of opposing side panels adjacent to the one of the side panels, and
   wherein the connecting members are hinged to the side panels.

2. A container according to claim 1, wherein each of the side panels is provided with a reinforcement assembly, wherein a first side edge of the connecting member of one of the side panels is connected to the reinforcement assembly of the one of the side panels.

3. A container according to claim 2, wherein the reinforcement assembly of each side panel has a plurality of reinforcement members interconnected into a frame.

4. A container according to claim 3, wherein each of the connecting members is provided with a hinge hole, and one of the reinforcement members of the reinforcement assembly is rotatably inserted into the hinge hole of the corresponding connecting member.

5. A container according to claim 2, wherein each of the side panels has an inner panel, an outer panel and the reinforcement assembly is disposed between the inner panel and the outer panel, wherein the inner panel and the outer panel are connected to each other.

6. A container according to claim 2, wherein a second side edge of the connecting member provided on the one of the side panels is provided with a first engagement structure, and a second side edge of the connecting member provided on a side panel adjacent to the one of the side panels is provided with a second engagement structure, the second side edge is opposite to the first side edge, wherein the first engagement structure and the second engagement structure are operatively engageable with each other to be rotatable, and the second side edge of the connecting member provided on the one of the side panels and the second side edge of the connecting member provided on the side panel adjacent to the one of the side panels are provided with locking structures.

7. A container according to claim 1, wherein the distance between inner sides of any pair of opposite protruding panels of the base is greater than or equal to a total width of one of the side panels and the connecting members on the one of the side panels.

8. A container according to claim 7, wherein the container further comprises a cover panel, which has a cover panel body and an outer peripheral protruding edge extending downward from the cover panel body, an inner peripheral surface profile of the outer peripheral protruding edge matches outer peripheral surface profiles of two pairs of the opposite protruding panels of the base.

9. A container according to claim 1, wherein the height of the protruding panel of the base is greater than the sum of a thicknesses of two pairs of opposing side panels.

10. A container according to claim 1, wherein a lower surface of each of the side panels extends with side panel hinging portions spaced apart from each other, the side panel hinging portions are provided with hinge pins; the protruding panel of the base is provided with open pockets, the open pockets are provided with hinge slots, wherein the hinge pins are rotatably mounted in the hinge slots.

11. A container according to claim 10, wherein a height of the open pockets provided in one pair of the opposite protruding panels is greater than a height of the open pockets provided in the other pair of the opposite protruding panels.

* * * * *